Figure 1:
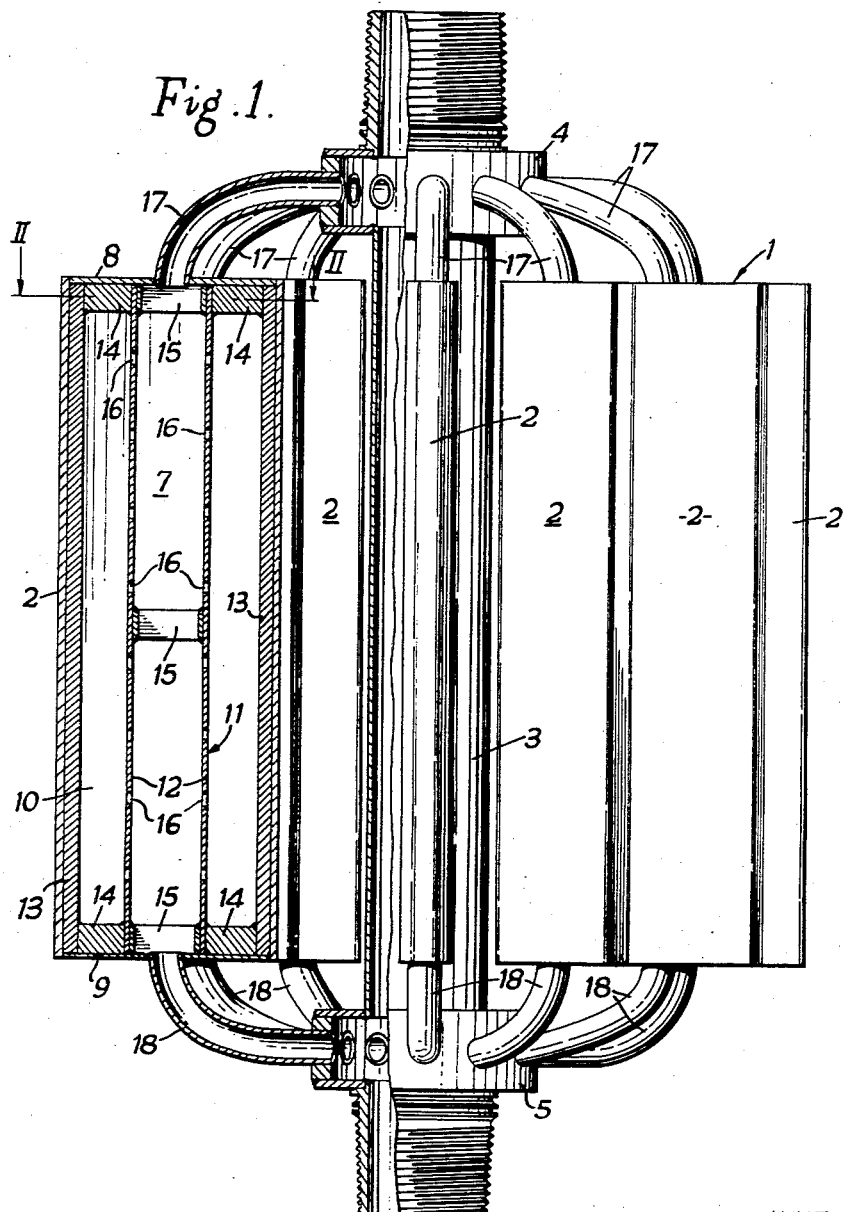

June 14, 1960  G. McLEISH COLLINS  2,940,596
FILTERS

Filed Dec. 3, 1956  3 Sheets-Sheet 2

INVENTOR
George McLeish Collins
BY
ATTORNEYS

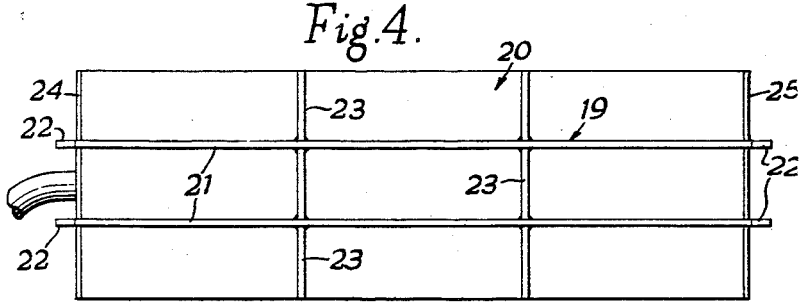
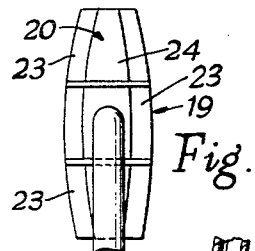
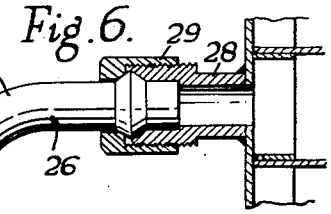
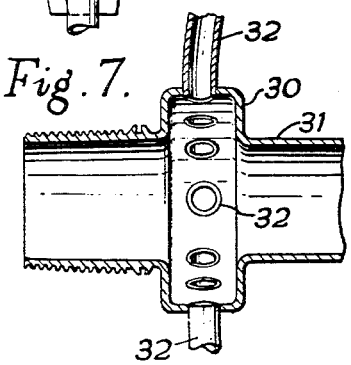
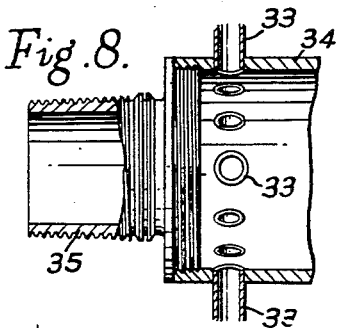
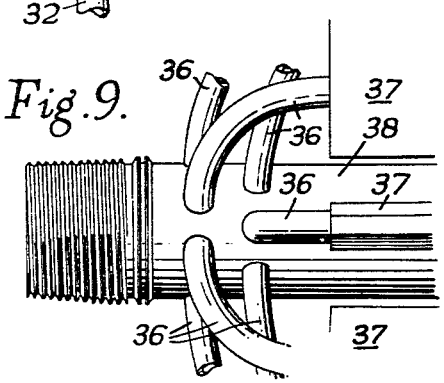

United States Patent Office 2,940,596
Patented June 14, 1960

2,940,596
FILTERS

George McLeish Collins, Birmingham, England, assignor to The Birmingham Small Arms Company Limited, Birmingham, England, a British company Filed Dec. 3, 1956, Ser. No. 625,997

Claims priority, application Great Britain Dec. 9, 1955

7 Claims. (Cl. 210—347)

This invention relates to filters of the kind in which porous metal filter elements are disposed more or less radially around and in communication with a substantially central tube.

In filters of this kind the elements are frequently secured in their assembled form by welding each one at one end to a header chest or chamber or by welding both ends to header chests or chambers which in turn are secured to and communicate with the central tube. There are drawbacks to such constructions, one being that welding of the filter element by orthodox welding methods invariably causes oxidation of the filter element near the weld. To minimize the adverse effects of oxidation it is necessary or desirable to treat the assembled unit in a reducing furnace at high temperature and, among other things, this tends to cause distortion. Another drawback is that the replacement of damaged filter elements is not easy and again involves welding of the elements with consequent reducing-furnace treatment.

It is one of the objects of this invention to provide a filter of the kind referred to in which the elements may be more easily replaced.

According to the invention, a filter of the kind referred to comprises filter elements from which extend tubes which are secured to a header chest or directly to the said central tube, the filter element tubes being sufficiently accessible to permit of any necessary replacement of an element or elements.

Each filter element may be replaceable by cutting the tubes connecting it to the header chest or central tube and securing the tubes of a fresh filter element to the portions of tube remaining in the header chest or central tube.

Alternatively, the said filter element tubes may each be provided with a detachable coupling for example, a screwed union, for enabling replacement of an element or elements to be effected without the necessity for cutting and resecuring tubes.

The header chest, where provided, and the central tube are preferably circular in cross-section and preferably less in diameter than that of the circle joining the inner edges of the filter elements.

Where the filter element tubes are connected directly to the said central tube, the central tube may be enlarged in diameter at or near the position or positions where the filter element tubes are connected to it. Alternatively, the enlarged diameter of the central tube may continue over the whole of its effective length adjacent the filter elements.

The filter element tubes preferably extend from the ends of the filter elements. The ends conveniently may be plates of non-porous metal, selected plates each having a suitable hole for accommodation of the respective tube which is secured to the end plate, for example by welding.

The filter elements are preferably of hollow construction and each comprise two curved porous metal plates secured together along their two longitudinal edges, for example by welding, with the said end plates secured to the ends of the porous plates to form an enclosure with which the said tubes communicate.

Each filter element is preferably reinforced either internally or externally by a supporting structure of non-porous material. Where the supporting structure is internal and has a member or members which extend completely across the enclosure, those members have apertures for permitting the passage of fluid within the enclosure.

The filter element tubes may be secured to the header chest or the central tube in a staggered manner so as to allow of the provision of more filter elements than otherwise would be possible where the diameter of the header chest or central tube is limited.

In the accompanying drawings—

Figure 2:
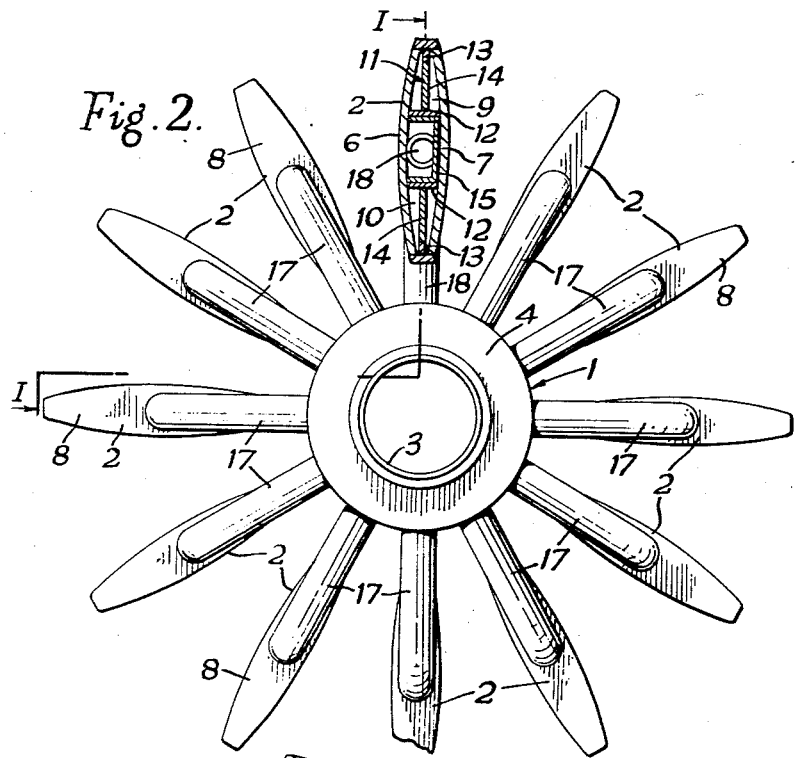
Figure 3:
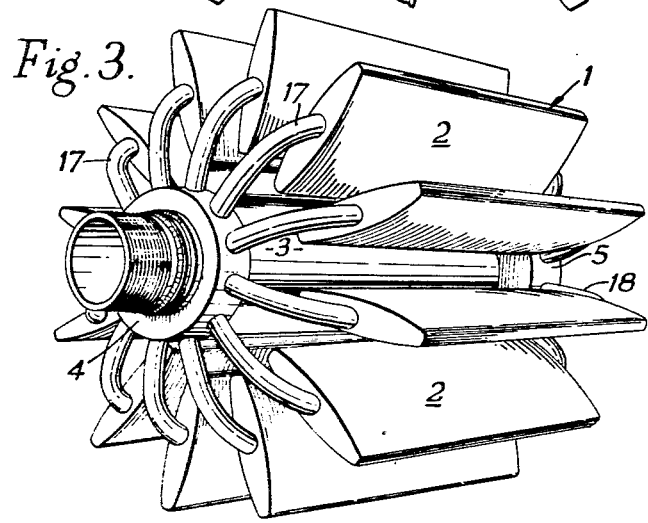

Figure 1 is a side view, partly in section on line I—I of Figure 2, of a filter according to the invention, Figure 2 is a plan view thereof, partly in section on line II—II of Figure 1, Figure 3 is a perspective view of the filter Figure 4 is a side elevation of a detail and illustrates another construction, Figure 5 is an end elevation of Figure 4, Figure 6 is a fragmentary side view in medial section of a detail and illustrates a further construction, Figure 7 is a fragmentary side view in medial section of a detail and illustrates still another construction, Figure 8 is a similar view to Figure 7 and illustrates a still further construction, and Figure 9 is a fragmentary side elevation of a detail and illustrates yet a further construction.

Referring to the drawings, in the construction shown in Figures 1, 2 and 3 thereof, as applied by way of example to a filter comprising an assembly 1 of filter elements generally indicated by the reference numeral 2 disposed more or less radially around a substantially central tube 3, the filter elements 2 each communicates with header chests 4, 5 respectively, and each header chest communicates with the central tube 3. Each filter element 2 consists of two curved porous metal (for example stainless steel) plates 6, 7 respectively, welded together along their two longitudinal edges and having non-porous end plates 8, 9 welded to them at their respective ends, the plates 6, 7, 8, 9 together forming the walls of an enclosure 10. A supporting structure 11 for each element 2 consists of two longitudinal members 12 arranged at right angles to a plane radial to the central tube 3 and passing through the respective elements, two longitudinal members 13 disposed in the said plane and each secured to the plates 6, 7 by the respective weld joining the plates 6, 7, four spacing members 14, two being disposed adjacent each end plate of the element 2 in the said plane and welded to the members 12 and 13 to extend between them, and three further spacing members 15 which are U-shaped and welded to and disposed between the two members 12, one adjacent each end plate of the respective elements and the remaining one midway between the end plates. Each supporting structure 11 serves to reinforce the respective filter element. The members of the supporting structure are preferably of non-porous metal (for example stainless steel) and the members 12 have a plurality of spaced apertures 16 in them.

Each end plate 8, 9 has one end of a tube 17, 18 respectively, extending through an aperture in the respective end plate and secured thereto by welding, each tube communicating with the enclosure 10, and having its other end secured by welding to the respective header chest 4, 5 so as to be in communication with the interior thereof. The ends of the central tube 3 project beyond the header chests 4, 5 and are screw-threaded for enabling them to be secured to lead-in and lead-out pipes, not shown, in usual manner.

The tubes 17, 18 are bent inwardly with as gradual a curve as possible to avoid pressure losses. The external diameter of the header chests 4, 5 is made less than the diameter of the circle joining the inner edges of the filter elements 2 to afford reasonable access to the tubes 17, 18 for effecting replacements. A further advantage of such a construction is that when particles are shed from the filter elements 2, for instance during a cleansing reverse flow through the filter, there is a minimum of projecting surfaces on which the particles can lodge. This is of some importance where a double ended header chest construction is employed in certain exothermic catalytic processes where the heat generated by the reaction from an accumulation of catalyst may be sufficient to have an adverse effect upon the construction.

To replace an element 2 the tubes 17, 18 are sawed or otherwise cut at any suitable point, the element removed, a fresh element, having a suitable length of tube secured thereto, is placed in position and the two portions of tube welded, brazed, soldered or otherwise secured together. It may be mentioned here that as the tubes are solid, i.e. non-porous, oxidation effects will be much less than in the case of porous metal and may in most cases be disregarded.

In another construction, shown in Figures 4 and 5, a supporting structure 19 for each element 20, one of which is shown in Figures 4 and 5, instead of being secured within the element is welded externally thereto, the structure 19 consisting of longitudinal members 21, lateral members 22 secured to the members 21 by welding and supporting the ends of the respective element 20, and cross-members 23 disposed intermediate end plates 24, 25 of the respective element 20 and secured by welding to the members 21. Otherwise the construction is similar to that described with reference to Figures 1 to 3.

In a third construction, illustrated in Figure 6, the construction is similar to that described with reference to Figures 1 to 3 or that described with reference to Figures 4 and 5, except that each tube (one of which is illustrated in Figure 6 and designated 26) is in two parts 27, 28 respectively, which are connected, and can be disconnected to effect replacement of a filter element, by a screwed union 29 of known kind. This construction has the advantage that replacement of an element can be effected quickly and easily without the necessity for cutting tubes and the subsequent welding or the like required for the connection of a fresh element.

In a fourth construction, shown in Figure 7, each header chest, one of which is shown in Figure 7 and designated 30, instead of being separate from and secured to a central tube is formed by a part of the central tube 31 itself, the part being of enlarged diameter at the position required. Tubes 32 are secured to the header chest in similar manner to that described with reference to Figures 1 to 3, the remainder of the construction being similar to that construction or to that described with reference to Figures 4 and 5, or that described with reference to Figure 6.

In Figure 8, there is illustrated a construction in which instead of separate header chests or header chests described with reference to Figure 7, tubes 33 from the filter elements (not shown) are secured to and communicate directly with a central tube 34 which is of enlarged diameter compared with the central tube 3 of the construction described with reference to Figures 1 to 3 except at its ends (one of which is shown in Figure 8 and designated 35) which are screwthreaded and of similar diameter to the ends of the central pipe 3 of the said construction. The enlarged diameter part of the central tube 34 therefore forms one continuous header chest extending over more than the whole length of the assembly of filter elements. The diameter of the said part of the central tube 34 is substantially similar to that of the header chests 4, 5 of the said construction and is similarly less than the diameter of the circle joining the inner edges of the filter elements. The remainder of the construction is similar to the said construction or to that described with reference to Figures 4 and 5, or to that described with reference to Figure 6.

In a construction alternative to that described with reference to Figure 8, there is illustrated in Figure 9 a construction wherein tubes 36 from filter elements 37 (three of which are shown in Figure 9) are secured directly to and communicate with a central tube 38 which is not of enlarged diameter at any part of its length. In order not to restrict the number of tubes 36 by virtue of the smallness of diameter of the tube 38, the tubes 36 are staggered as shown in Figure 9. The remainder of the construction is similar to that described with reference to Figures 1 to 3, or that described with reference to Figures 4 and 5, or that described with reference to Figure 6.

It will be appreciated that all constructions described herein have in common the advantage that in replacement of filter elements oxidation of the porous parts of the filter is avoided, and consequently the necessity for subsequent reduction treatment, which can lead to distortion, is eliminated.

I claim:

1. A filter comprising a central tube, hollow filter elements arranged radially around said central tube, each hollow filter element having opposed porous metal side plates and non-porous metal end plates defining an enclosure with said side plates, and fluid communication tubes welded at one end to said non-porous metal end plates and fixed at their outer ends to said central tube and providing communication between said enclosures of the filter elements and said central tube.

2. A filter comprising an assembly of hollow porous metal filter elements arranged radially around a central tube in spaced relation thereto, each hollow filter element having porous metal side walls and non-porous metal end walls having apertures and defining an enclosure with said side walls, a header chest at each end of said central tube and in fluid communication therewith, and tubes connected at opposite ends to said header chests and said non-porous end walls of said filter elements and extending into associated ones of said apertures for providing fluid communication between the interiors of the filter elements and said central tube, portions of said connecting tubes being accessible for effecting individual removal and replacement of the respective filter elements by cutting said connecting tubes and securing of the tube portions of fresh filter elements to the tube portions remaining in communication with the header chest of said central tube.

3. A filter comprising a central tube, hollow filter elements arranged radially around said central tube, each filter element comprising two outwardly curved porous metal plates secured together along opposite longitudinal edges thereof, and opposed non-porous metal end plates secured to the ends of said curved plates, said curved plates and end plates together defining an enclosure within the plates, and filtered medium fluid communication tubes for each filter element, each of said tubes engaging an aperture in an end plate for fluid communication with the respective enclosure, and each tube also communicating with said central tube for establishing fluid communication between the respective enclosure and said central tube.

4. A filter according to claim 3, including reinforcement means for reinforcing said hollow filter elements.

5. A filter according to claim 3, including external reinforcement means for reinforcing said hollow filter elements.

6. A filter comprising a central tube, hollow filter elements arranged radially around said central tube, each filter element comprising two reversely curved porous metal plates secured together along longitudinal edges thereof, and two non-porous metal end plates having apertures therein and secured to the ends of said curved plates, said curved plates and end plates together defining an enclosure within said plates, reinforcement means for internally reinforcing said hollow filter elements and comprising at least one non-porous member extending across the enclosure of the respective filter element and having at least one aperture therein for the passage of fluid therethrough to all parts of said enclosure, and filtered medium fluid communication tubes providing communication between the enclosures of the respective filter elements and said central tube and welded to associated ones of said end plates in surrounding relation to said apertures therein.

7. A filter comprising a central tube, hollow filter elements arranged radially around said central tube, each hollow filter element comprising porous metal side plates and non-porous metal ends, and inlet and outlet tubes for connecting the ends of the respective filter elements to said central tube and providing communication between the interiors of said filter elements and said central tube, said tubes extending radially outwardly from said central tube in staggered relationship and being curved to meet said filter elements in directions parallel to the axis of said central tube.

References Cited in the file of this patent

UNITED STATES PATENTS

| | | |
|---|---|---|
| 767,808 | Forbes | Aug. 16, 1904 |
| 967,776 | Huber | Aug. 16, 1910 |
| 1,193,334 | Acheson | Aug. 1, 1916 |
| 2,394,076 | Kisch | Feb. 5, 1946 |
| 2,406,065 | Dickinson et al. | Aug. 20, 1946 |

FOREIGN PATENTS

| | | |
|---|---|---|
| 62,360 | Germany | June 28, 1891 |
| 10,984 | Great Britain | Dec. 8, 1845 |